(No Model.) 3 Sheets—Sheet 3.
W. E. PRALL.
PROPELLING AND HEATING STREET CARS.
No. 388,444. Patented Aug. 28, 1888.
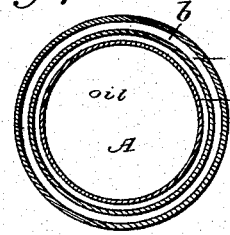
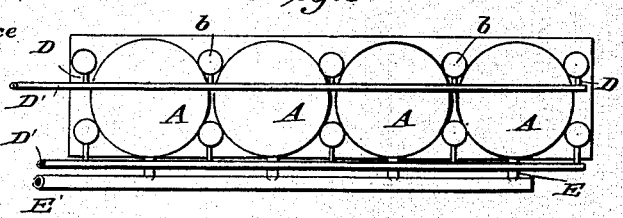
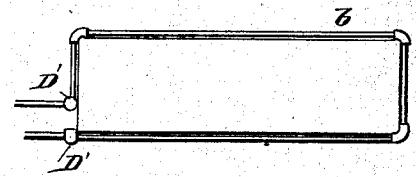
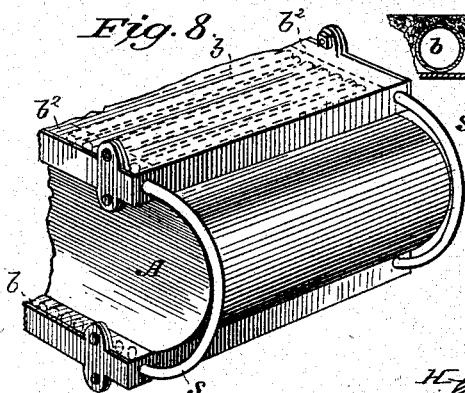
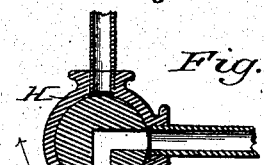
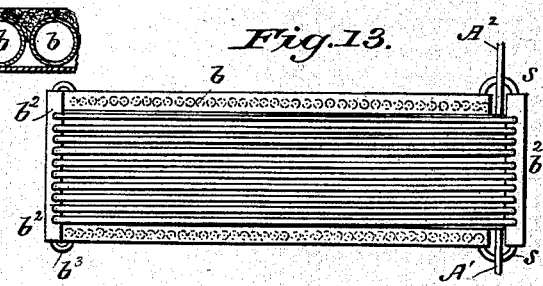
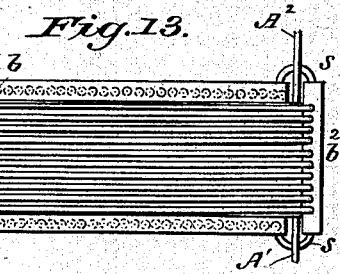
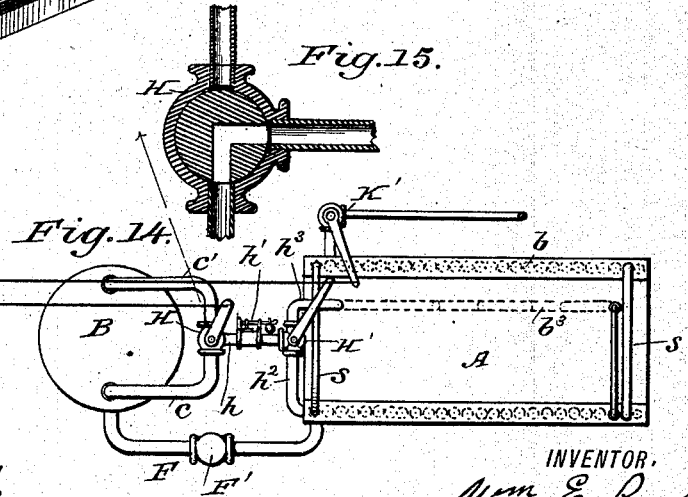
WITNESSES:
Fred G. Dieterich
G. H. Whitaker
INVENTOR,
Wm. E. Prall
BY
W. W. Canfield
ATTORNEY.
N. PETERS, Photo-Lithographer, Washington, D. C.

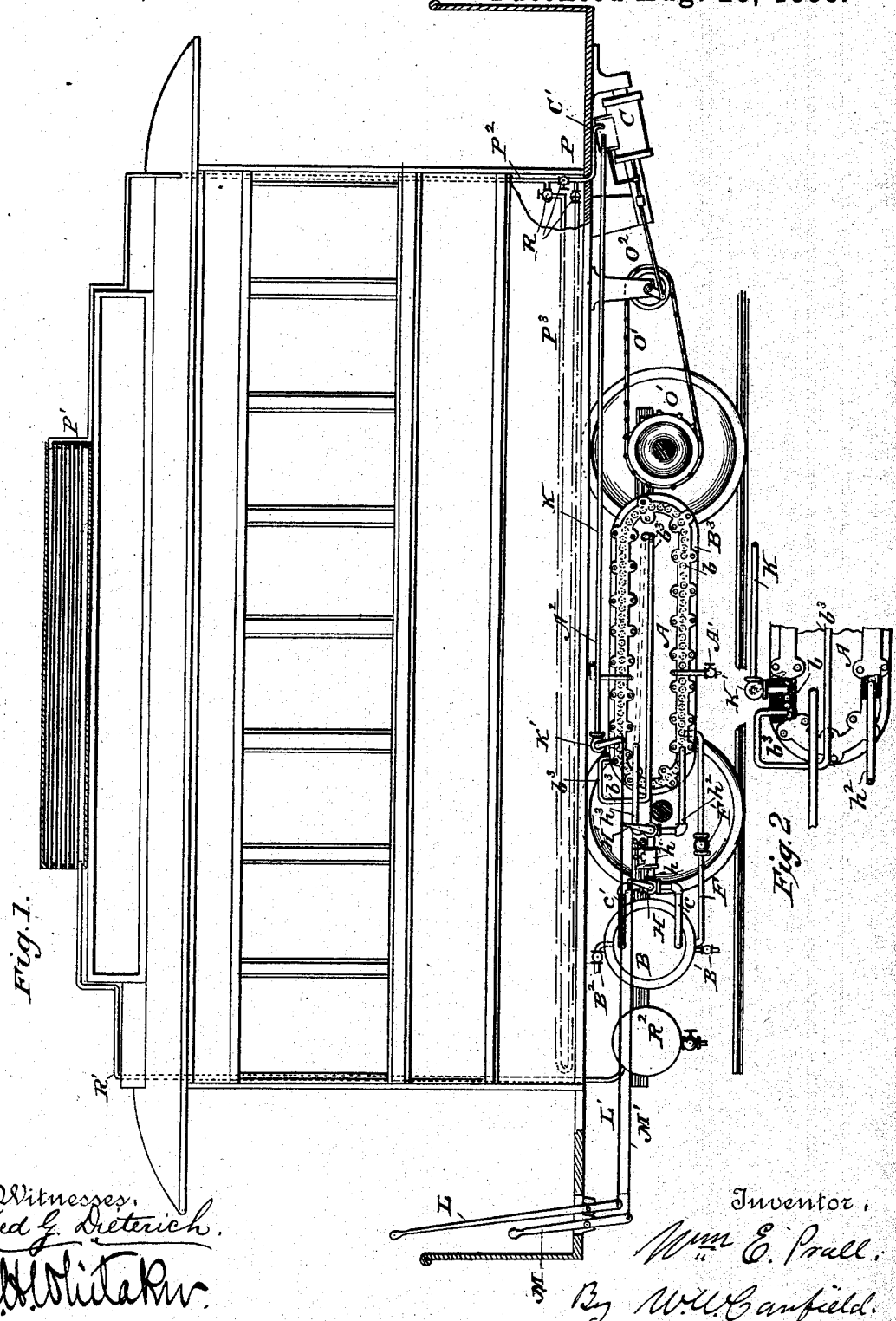

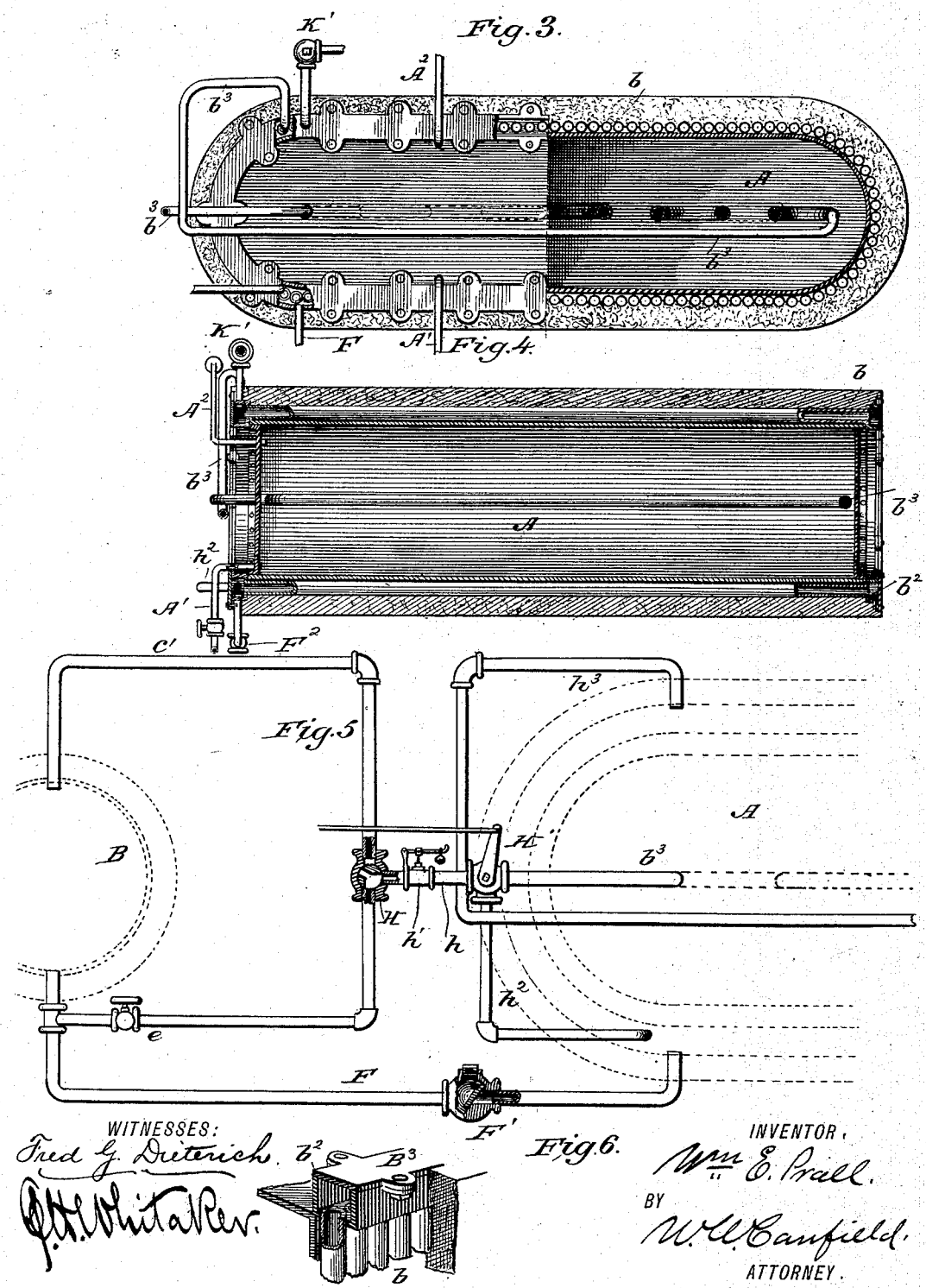

UNITED STATES PATENT OFFICE.

WILLIAM E. PRALL, OF WASHINGTON, DISTRICT OF COLUMBIA, ASSIGNOR TO THE NATIONAL TRAMWAY MOTOR COMPANY, OF NEW YORK, N. Y.

PROPELLING AND HEATING STREET-CARS.

SPECIFICATION forming part of Letters Patent No. 388,444, dated August 28, 1888.

Application filed March 31, 1888. Serial No. 269,087. (No model.)

*To all whom it may concern:*

Be it known that I, WILLIAM E. PRALL, a citizen of the United States, residing at Washington, in the District of Columbia, have invented certain new and useful Improvements in Means for Propelling Cars and Similar Railway-Carriages; and I do hereby declare the following to be a full, clear, and exact description of the invention, such as will enable others skilled in the art to which it appertains to make and use the same.

My invention is an improvement in means for propelling and heating street-cars and other similar vehicles in which superheated water, superheated oil, and steam, or their equivalents, are employed as power and heat producing mediums, and in which superheated water and superheated oil, or their equivalents, are employed as a means of storing heat and generating steam or other expansive vapors to propel the engine and heat the car without combustion; and the invention consists in the construction, combination, and arrangement of parts disclosed in the following specification, of which the accompanying drawings form a part, and in which similar letters of reference indicate the same or equivalent parts throughout the several views.

Figure 1 is a view showing in elevation a car provided with my improved apparatus. Fig. 2 represents a detail. Figs. 3, 4, 6, 7, 8, 10, 11, and 13 represent details in construction and modifications of the superheated-oil tank. Fig. 5 is an enlarged end plan view of the water and oil tanks, together with the pipes connecting the same and certain details relating thereto. Fig. 9 is a modified arrangement of the oil and water tanks and their connections. Fig. 12 shows one mode of applying the non-heat-conducting material to the oil-tanks and the evaporating-tubes surrounding the same. Fig. 14 is a plan of a modified arrangement of the apparatus shown in Fig. 1, and Fig. 15 is a detail showing a form of valve used in the pipes which connect the water and oil tanks.

In applying my apparatus to a car I adopt the general plan shown in Fig. 1. The storage or superheated water and oil tanks, together with the engine and other operative mechanism, being placed beneath the car.

A represents the storage or oil tank, placed between the wheels of the car; B, the superheated-water tank, and C the engine.

The tank A may be made of any desired material and of any preferred form. It is provided with pipes $A'$ and $A^2$, by which the oil or other heat-storage material may be introduced and discharged. The tank is also surrounded by small closely-connected copper tubes $b$, said tubes being in communication with chamber $b^2$ in such a manner as to permit of a free communication between said chambers and tubes, whereby a large evaporating and expanding surface is obtained without the friction consequent to one long continuous pipe and freedom from the trouble consequent upon the expansion and contraction of such a pipe, together with ease of access to the tubes in case they should at any time require cleaning. This may be done by simply removing the flange $B^3$, which is attached to and covers the chamber $b^2$, as shown in Figs. 1, 3, 4, and 6. The tubes $b$ may be applied to the tank A by having the chamber $b^2$, with which they communicate, constructed of a shape similar to that of the tank, and when said chamber is placed at each end of the tank, as shown in Fig. 4, the pipes will rest upon the outer surface thereof. I also contemplate the employment of a coil, $b^3$, within the oil-tank, placed directly in contact with the hydrocarbon or heat-storage material, whereby heat will be transmitted from the storage material to the coil by direct contact, while in the case of the tubes $b$ the tubes receive their heat by radiation from the walls of the tank containing the heat-storage material, by which the radiated heat, which would otherwise be lost, will be taken up and utilized, and the covering which surrounds the tubes $b$ prevents the radiation therefrom.

In Fig. 7 is shown a form of construction in which the oil-tank is surrounded by a continuous chamber, $b$, which takes the place of the tubes $b$ shown in the other views, the said chamber being separated from the tank by an air-space.

In Fig. 9 the tubes $b$ are represented by enlarged tubes placed at the junction of a series of oil-tanks, said tubes being provided with branch connections D, which communicate with a common supply and exhaust, $D'$, the oil-tanks being provided with branch connections E, communicating with a common supply and exhaust, E'.

In Figs. 10 and 11 I have shown a mode of constructing the tube $b$ in sections of pipe screwed together, having a common supply and exhaust, D'.

Fig. 8 shows a plan of construction similar to that of Figs. 1, 3, and 4, with this difference, that the chamber $b^2$ in the place of encircling the oil-tank is made to extend so that the top and bottom only of the tank will be covered by pipes $b$, said chamber being connected at each end by pipes S. Fig. 13 is a modification of the oil-tank and its attachments in this respect. In addition to covering the top and bottom of the tank with said tubes, as in Fig. 8, it is proposed to surround all the sides of the tank with the evaporating-tubes. This is accomplished by surrounding all the sides of the tank with the evaporating-tubes, said tubes on four sides terminating in the chamber $b^2$ and being brought in communication with the top and bottom sections by tubes S. By this construction I have surrounded the entire storage or oil tank with the evaporating and expanding tubes and have established a communication throughout all the tubes and chambers in a manner to establish perfect circulation, and thereby preventing loss of heat by radiation from the storage-tank, as the radiation from all sides will be taken up by said evaporating and expanding tubes and chamber, the tubes, of course, being covered, so as to prevent as much as possible radiation therefrom.

Having fully described the heat-storage tank and its connected expanding and evaporating chambers and tubes in the various modifications shown, I will now proceed to describe the construction of the tank B, which may be charged with superheated water, liquid ammonia, ether, alcohol, carbonic-acid gas, or any other evaporating substance that may be employed, superheated water being preferable to all others.

The tank B is constructed of metal and of suitable strength to stand any desired pressure, and may be placed in any desired position, preferably under the body of the car and as close as possible to the storage-tank, and is to be provided with non-heat-conducting covering to prevent radiation therefrom. This tank will also be provided with supply and discharge pipes B' and $B^2$, by which it is charged and made ready for operation. It is further provided with pipes $c$ and $c'$, connecting said tank at the top and bottom with a three-way valve, H. (Shown in Fig. 15.) A pipe, $h$, provided with a pressure-reducing valve, $h'$, connects the valve H with another three-way valve, H', and pipes $h^2$ and $h^3$ connect valve H' with the evaporating and expanding chamber and tubes connected with the heat-storage tank. Tank B is also provided with a back-pressure pipe, F, extending to and communicating with the evaporating-chamber, connected with the heat-storage tank. This pipe is provided with a check-valve, F'. (Shown more fully in Fig. 5.) A steam-pipe, K, connects the evaporating-chamber with the steam-chamber C' of the engine, and a valve, K', is placed in said pipe near its junction with the evaporating-chamber. A lever, L, is provided with a rod, L', which connects the lever L with the three-way valve H', and also with valve K' in the steam-pipe. M is a lever connected by rod M' with the three-way valve H, and O is a chain belt extending from a gearing, O', on the car-axle to gearing $O^2$ on the crank-shafts, with which the engine is connected.

An exhaust-pipe, P, leads from the engine and communicates with the condenser P', which may be placed on top of the car, either by direct line through pipe $P^2$ or through pipes $P^3$, placed under the seats of the car. The direction of the exhaust-steam will be controlled by valves R, by which it may be directed either through the interior of the car, to heat the same in cold weather, or directly into the condenser.

The condenser for use where superheated water is employed is a simple affair and may be constructed of light tubes surrounded by a light shell, forming a space around the tubes, into which space the steam is allowed to exhaust, the ends of the tubes communicating with the atmosphere at each end, so as to permit a free circulation of air through the same. Where it is desirable to save the condense-water, it may be conducted by means of a pipe, R', to a receiving-tank, $R^2$, placed underneath the car.

I have also shown in Fig. 12 one mode of covering the evaporating-tubes on the outer side with some well-known non-conductor, by which radiation from the outer sides of said tubes is prevented, while the lower half of the tubes is left free to absorb the radiated heat from the heat-storage tank, which they surround, and in Fig. 15 I have shown an enlarged view of the tanks and the pipes connecting the same, together with the levers and rods for controlling the valves with which the pipes are provided. In this view but two sides of the storage-tank are provided with evaporating-tubes, and they are connected by means of pipes S, as in Fig. 8, and in this figure pipe $b^3$ is shown terminating in the evaporating chamber or tube at the bottom, so as to cause the water to not only pass through the pipe placed within the storage-tank, but to be discharged, so as to pass through the outer layer or series of evaporating-tubes before it passes to the engine.

In the operation of this apparatus the tanks B and A are filled at stations provided for the purpose, the tank B with superheated water or any other liquid that will serve the purpose, and tank A with highly-heated oil or any other substance in which a high degree of heat may be stored without too great pressure. The manipulation of the valves K' and H' by means of lever L will establish a communication between tank B and the evaporating chamber or tubes around or through tank A. If lever M be operated so as to open communication between the lower part of tank B and the evaporating-tubes, the superheated water will flow through the pressure-reducing valve into the evaporating chamber or tube. The pressure-reducing valve $h'$ is so regulated as to establish any required degree of pressure in the evaporating chamber and tubes, and to automatically regulate and maintain such pressure so long as the valves H' and K' are open. The superheated water, after passing the valve $h'$ and entering the steam-chamber $b^2$ and the tube $b$, is immediately converted into steam by means of its own specific heat and the radiated heat from the heat-storage tank. The steam in passing through the many evaporating and expanding tubes becomes superheated and expanded to a high degree. The valve K' being open, this superheated steam passes directly to the engine by which the car is propelled. If great power is required, or when the heat in the storage-tank has been reduced in temperature by the proper manipulation of lever L, the superheated water or steam may be admitted into the coil $b^3$ within the heat-storage tank before entering the evaporating-tubes around said tank, thereby increasing the rapidity of the evaporation and the expansion of the steam. If on the return-trip it is found the temperature of the storage-tank is not sufficient to evaporate superheated water into superheated steam as fast as required, by the movement of lever M the water may be cut off from tank B, and saturated steam created by the specific heat of the water in tank B may be thrown into the expanding-chamber, and thereby converted into superheated steam and utilized with great economy and force.

To stop the car, a single movement of the lever L in the opposite direction from that required to start the car is all that is required, as thereby valves H' and K' will be closed and steam will be prevented from entering the engine and superheated water or steam from entering the converting-chamber from tank B. Should, however, there be some water still remaining in the evaporating chamber and tubes, in order to provide against excessive pressure or waste of heat by blowing off, the pipe F and valve F' are connected with the bottom of said chamber and tank B, and as soon as the pressure in said chamber and tubes exceeds the pressure in tank B any water left in said chamber and tubes will be driven back and through valve F' into tank B.

It will be seen that by this simple and powerful apparatus, in which there is no possibility of overpressure, there being no generation of heat, and without any skilled engineer or fireman, and without any of the annoyance of dust, smoke, and smells consequent to the combustion of fuel for power purposes, a simple, safe, and economical apparatus for propelling and heating street-cars or other similar vehicles is produced.

In the following claims the words "superheated water" are used to indicate either hot water or any other fluid capable of being heated and converted into steam or vapor, and the words "heat-storage tank" to indicate tank A, charged with any material capable of being heated to a high degree without producing combustion or too great pressure.

Having fully described my invention and its method of operation, I claim and desire to secure by Letters Patent of the United States—

1. In an apparatus for propelling street-cars, the combination of a superheated-water tank, a heat-storage tank provided with evaporating and expanding tubes surrounding the same, and said pipes provided with valves connecting the superheated-water tank with said tubes, substantially as shown and described.

2. The combination, with a superheated-water tank, a heat-storage tank provided with evaporating-tubes surrounding the same, and an evaporating tube or coil within the same, of pipes provided with controlling cocks or valves forming communications between the superheated-water tank and the said tubes, substantially as shown and described.

3. The combination of the superheated-water tanks, the heat-storage tank, the evaporating-tubes, the pipes connecting the superheated-water tank and the evaporating-tubes, and the back-pressure pipe provided with the back-acting valve F', substantially as shown and described.

4. The combination of the superheated-water tank and the heat-storage tank provided with evaporating-tubes, said tanks being connected by means of pipes communicating with the upper and lower portion of the water-tank, said pipes being controlled by a valve or valves in such a manner as to cause the flow of either superheated water from the bottom or saturated steam from the top of the superheated-water tank into the evaporating-tubes.

5. The combination of the superheated-water tank and the heat-storage tank provided with evaporating-tubes, pipes connecting the water-tank with the evaporating-tubes, pipes connecting the evaporating-tubes with the engine, and valves controlling said pipes operated by one common lever in such a manner as to admit water or steam to the evaporating-tubes at the same time that steam is admitted from the tubes to the engine, and to shut off the supply of water or steam to the evaporating-tubes simultaneously with cutting off the supply of steam to the engine.

6. The combination, with the superheated-water tank, the heat-storage tank provided with the evaporating-tubes within and around the same, and pipes connecting the water-tank with the evaporating-tubes, of a three-way valve placed in said pipes, so arranged that the water or steam from the superheated-water tank may be admitted either through the evaporating-pipe within the storage-tank or be shut off therefrom and caused to enter the evaporating-tubes around the storage-tank, substantially as shown and described.

7. The combination of the superheated-water tank, the heat-storage tank provided with evaporating-tubes, the pipes connecting the water-tank with the evaporating-tubes, the engine, and a condenser connected with the exhaust of the engine, substantially as shown described.

8. The combination of the superheated-water tank, the storage-tank provided with the evaporating-tubes, pipes connecting the water-tank with the evaporating tubes, the engine, the condenser, the radiating pipes or coils within the car, and pipes connecting the condenser, the radiating coils, and the exhaust of the engine, substantially as shown and described.

9. A heat-storage tank provided with evaporating-tubes on the outside thereof, said tubes being covered with non-heat-conducting material, substantially as shown and described.

10. A heat-storage tank provided with evaporating-tubes within and outside of the same and non-heat-conducting material over the outer tubes, substantially as shown and described.

11. A heat-storage tank provided with an evaporating-chamber, $b^2$, evaporating-tubes $b$, and non-heat-conducting material on the outside of said tubes, substantially as shown and described.

12. A heat-storage tank provided with an evaporating-chamber, $b^2$, and evaporating-tubes $b$ and $b^3$, substantially as shown and described.

13. The combination of the tank B, the tank A, provided with the evaporating tubes, the pipes connecting tank B with said tubes, the three-way valves H and H', and the steam-valves K', the said valves H and K' being operated together, and the pressure-reducing valve $h'$, substantially as shown and described.

14. The combination of the tanks B and A, the tank A being provided with evaporating-tubes, the pipes $c$ and $c'$, connecting the tank B with said tubes, provided with valves H, H', and $h'$, and the pipe F, provided with valve F', substantially as shown and described.

In testimony whereof I affix my signature in presence of two witnesses.

WILLIAM E. PRALL.

Witnesses:
   CHAS. A. CLEMENTS,
   J. B. CALLAHAN.